(12) United States Patent
Wang

(10) Patent No.: US 8,509,519 B2
(45) Date of Patent: Aug. 13, 2013

(54) ADJUSTING PERSPECTIVE AND DISPARITY IN STEREOSCOPIC IMAGE PAIRS

(75) Inventor: Sen Wang, Rchester, NY (US)

(73) Assignee: Intellectual Ventures Fund 83 LLC, Las Vegas, NV (US)

(*) Notice: Subject to any disclaimer, the term of this patent is extended or adjusted under 35 U.S.C. 154(b) by 874 days.

(21) Appl. No.: 12/511,111

(22) Filed: Jul. 29, 2009

(65) Prior Publication Data
US 2011/0026807 A1 Feb. 3, 2011

(51) Int. Cl.
*G06K 9/00* (2006.01)

(52) U.S. Cl.
USPC .............. 382/154; 382/103; 382/106

(58) Field of Classification Search
None
See application file for complete search history.

(56) References Cited

U.S. PATENT DOCUMENTS

| | | | |
|---|---|---|---|
| 4,101,217 A | 7/1978 | Fergg et al. | |
| 4,707,119 A | 11/1987 | Terashita | |
| 4,945,406 A | 7/1990 | Cok | |
| 4,984,013 A | 1/1991 | Terashita | |
| 5,016,043 A | 5/1991 | Kraft et al. | |
| 5,903,660 A * | 5/1999 | Huang et al. | 382/132 |
| 6,243,133 B1 | 6/2001 | Spaulding et al. | |
| 6,252,976 B1 | 6/2001 | Schildkraut et al. | |
| 6,275,605 B1 | 8/2001 | Gallagher et al. | |
| 6,573,932 B1 | 6/2003 | Adams, Jr. et al. | |
| 6,636,646 B1 | 10/2003 | Gindele | |
| 6,845,181 B2 | 1/2005 | Dupin et al. | |
| 6,873,723 B1 * | 3/2005 | Aucsmith et al. | 382/154 |
| 6,873,743 B2 | 3/2005 | Steinberg | |
| 7,043,090 B2 | 5/2006 | Gindele et al. | |
| 7,046,400 B2 | 5/2006 | Gindele et al. | |
| 7,116,838 B2 | 10/2006 | Gindele et al. | |
| 7,129,980 B1 | 10/2006 | Ashida | |
| 7,158,174 B2 | 1/2007 | Gindele et al. | |
| 7,230,538 B2 | 6/2007 | Lai et al. | |
| 7,289,154 B2 | 10/2007 | Gindele | |
| 7,421,149 B2 | 9/2008 | Haynes et al. | |
| 7,421,418 B2 | 9/2008 | Nakano | |
| 7,526,127 B2 | 4/2009 | Koide et al. | |
| 7,689,021 B2 * | 3/2010 | Shekhar et al. | 382/131 |

(Continued)

FOREIGN PATENT DOCUMENTS

| | | |
|---|---|---|
| EP | 1 968 329 A2 | 9/2008 |
| WO | WO 2008/102296 A2 | 8/2008 |
| WO | WO 2009/072070 A1 | 6/2009 |

OTHER PUBLICATIONS

A. Hoover et al.: "An Experimental Comparison of Range Image Segmentation Algorithms", IEEE Transactions on Pattern Analysis and Machine Intelligence, IEEE Service Center, Los Alamitos, CA, US LNKD-DOI:10.1109/34.506791, vol. 18, No. 7, Jul. 1, 1996, pp. 673-689, XP002213073, ISSN: 0162-8828, p. 674; Table 1.

(Continued)

*Primary Examiner* — Matthew Bella
*Assistant Examiner* — Thomas Conway

(57) ABSTRACT

A system and method for adjusting perspective and disparity in a stereoscopic image pair using range information includes receiving the stereoscopic image pair representing a scene; identifying range information associated with the stereoscopic image pair and including distances of pixels in the scene from a reference location; generating a cluster map based at least upon an analysis of the range information and the stereoscopic images, the cluster map grouping pixels of the stereoscopic images by their distances from a viewpoint; identifying objects and background in the stereoscopic images based at least upon an analysis of the cluster map and the stereoscopic images; generating a new stereoscopic image pair at least by adjusting perspective and disparity of the object and the background in the stereoscopic image pair, the adjusting occurring based at least upon an analysis of the range information; and storing the new generated stereoscopic image pair in a processor-accessible memory system.

20 Claims, 4 Drawing Sheets

(56) References Cited

U.S. PATENT DOCUMENTS

| | | |
|---|---|---|
| 2002/0126893 A1 | 9/2002 | Held et al. |
| 2003/0007687 A1 | 1/2003 | Nesterov et al. |
| 2003/0044063 A1 | 3/2003 | Meckes et al. |
| 2003/0044070 A1 | 3/2003 | Fuersich et al. |
| 2003/0044178 A1 | 3/2003 | Oberhardt et al. |
| 2003/0223622 A1 | 12/2003 | Simon et al. |
| 2004/0240749 A1 | 12/2004 | Miwa et al. |
| 2004/0247176 A1 | 12/2004 | Aucsmith et al. |
| 2005/0089212 A1* | 4/2005 | Mashitani et al. ............ 382/154 |
| 2005/0157204 A1 | 7/2005 | Marks |
| 2007/0121094 A1 | 5/2007 | Gallagher et al. |
| 2007/0126921 A1 | 6/2007 | Gallagher et al. |
| 2007/0274604 A1 | 11/2007 | Schechner et al. |
| 2008/0112616 A1 | 5/2008 | Koo et al. |

OTHER PUBLICATIONS

"Dominant Sets and Pairwise Clustering", by Massimiliano Pavan et al., IEEE Transactions on Pattern Analysis & Machine Intelligence, vol. 29, No. 1, Jan. 2007, pp. 167-172.

"Object Detection using a Max-Margin Hough Transform" by S. Maji et al., Proc. IEEE Conf on Computer Vision and Pattern Recopition, 2009.

John Canny, "A Computational Approach to Edge Detection", IEEE Transactions on Pattern Analysis and Machine Intelligence, IEEE Service Center, Los Alamitos, CA, US LNKD-DOI:10.1109/TPAMI.1986.4767851, vol. PAMI-08, No. 6, Nov. 1, 1986, pp. 679-698, XP000604891, ISSN: 0162-8828 abstract.

"Object-Specific Figure-Ground Segregation" by S. X. Yu, et al., Proc. IEE Conf. on Computer Vision and Pattern Recognition, 2003.

"Object Segmentation Using Graph Cuts Based Active Contours" by N. Xu et al., Proc. IEEE Conf. on Computer Vision and Pattern Recognition, 2003.

International Preliminary Report on Patentability for PCT/US2010/001946, issued Jan. 31, 2012.

International Search Report and Written Opinion on PCT/US2010/001946 mailed Sep. 15, 2010.

\* cited by examiner

ADJUSTING PERSPECTIVE AND DISPARITY IN STEREOSCOPIC IMAGE PAIRS

CROSS-REFERENCE TO RELATED APPLICATIONS

Reference is made to commonly assigned, co-pending U.S. Application Publication No. 2012/0057745 published Mar. 8, 2012, entitled: "Detection of Objects Using Range Information", by S. Wang, which is incorporated herein by reference.

FIELD OF THE INVENTION

This invention relates to adjust digital images, and more particularly to a method for adjusting perspective and disparity in a stereoscopic image pair using range information.

BACKGROUND OF THE INVENTION

Stereo cameras or multi-view cameras, generally capture left and right images using two or more cameras functioning similarly to human eyes, and cause a viewer to feel a stereoscopic effect due to disparities between the two images. Specifically, a user observes parallax when a different image is presented to each eye due to the disparity between the two images captured by a stereo camera, and this binocular parallax causes the user to experience a stereoscopic effect. However, the stereo images are often not pleasing, because of the perspective or parallax.

There are many references that describe how to capture stereo image pairs and how to adjust the parallax of the stereo image pairs. Most of these methods change the entire scene without adjusting specific objects. For example, in U.S. Patent Application Publication No. 2008/0112616, disparity of stereo images is adjusted based on disparity histogram.

A need exists for a method to adjust perspective of stereoscopic image pairs with modifying different disparities of objects with different distance from the view point in a scene.

SUMMARY OF THE INVENTION

The present invention represents a method for adjusting perspective and disparity in a stereoscopic image pair, and the method implemented at least in part by a data processing system and comprising the steps of:
  receiving the stereoscopic image pair representing a scene;
  identifying range information associated with the stereoscopic image pair and including distances of pixels in the scene from a reference location;
  generating a cluster map based at least upon an analysis of the range information and the stereoscopic images, the cluster map grouping pixels of the stereoscopic images by their distances from a viewpoint;
  identifying objects and background in the stereoscopic images based at least upon an analysis of the cluster map and the stereoscopic images; generating a new stereoscopic image pair at least by adjusting perspective and disparity of the object and the background in the stereoscopic image pair, the adjusting occurring based at least upon an analysis of the range information; and
  storing the new generated stereoscopic image pair in a processor-accessible memory system.

It is an advantage of the present invention that by using range information objects and background can be detected and segmented with improved accuracy. Furthermore, the perspective and disparity in a stereoscopic image pair can be adjusted efficiently.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The phrase, "digital content record", as used herein, refers to any digital content record, such as a digital still image, a digital audio file, a digital video file, etc.

It should be noted that, unless otherwise explicitly noted or required by context, the word "or" is used in this disclosure in a non-exclusive sense.

Figure 1:
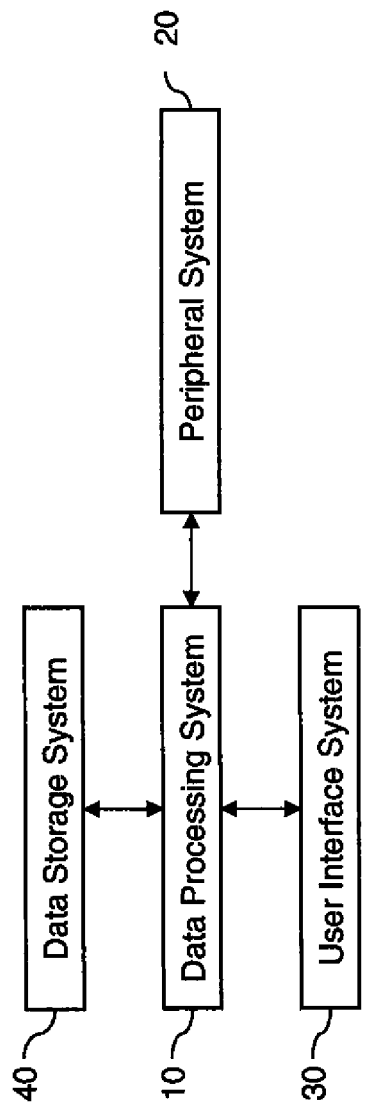
FIG. 1 is a high-level diagram showing the components of a system for adjusting perspective and disparity in a stereoscopic image pair according to an embodiment of the present invention.

FIG. 1 is a high-level diagram showing the components of a system for detecting objects and background in a digital image according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

Figure 2:
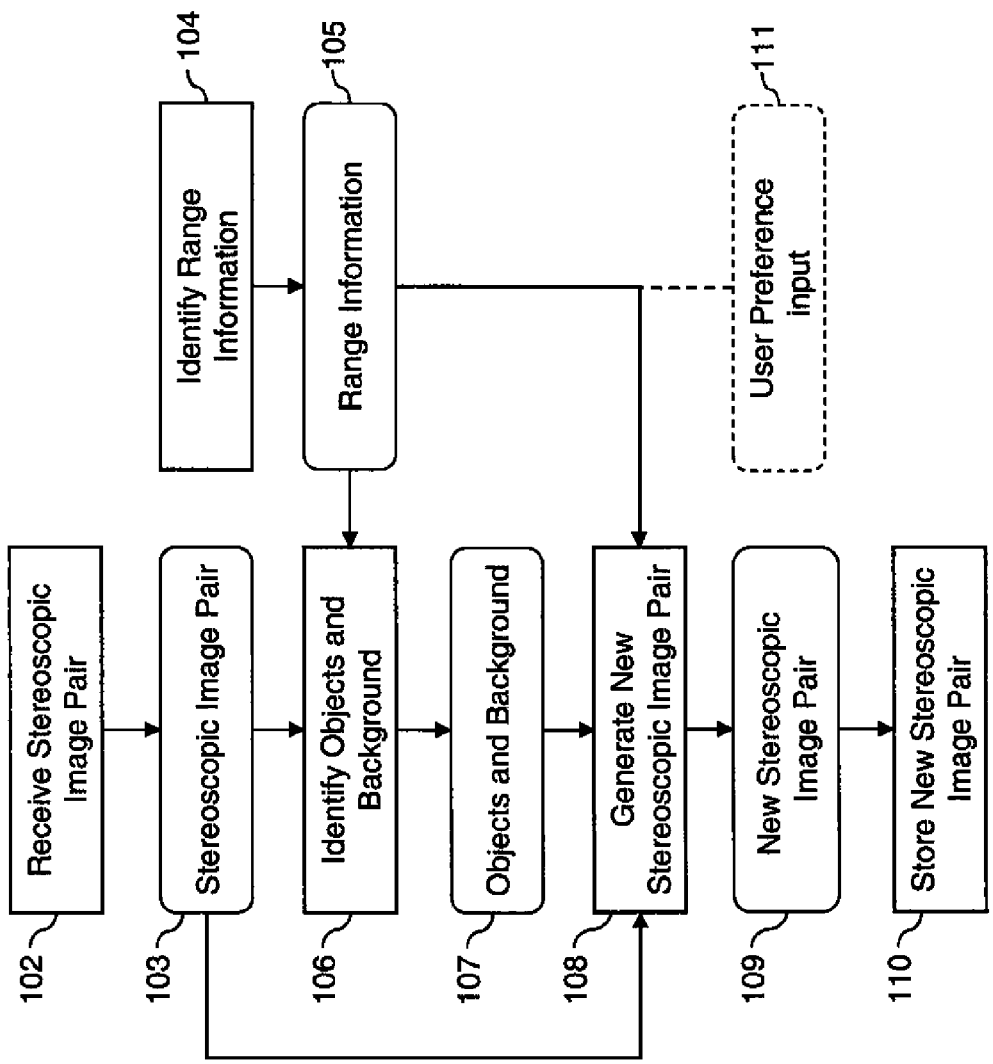
FIG. 2 is a flowchart illustrating a method for adjusting perspective and disparity in a stereoscopic image pair, according to an embodiment of the present invention.
Figure 3:
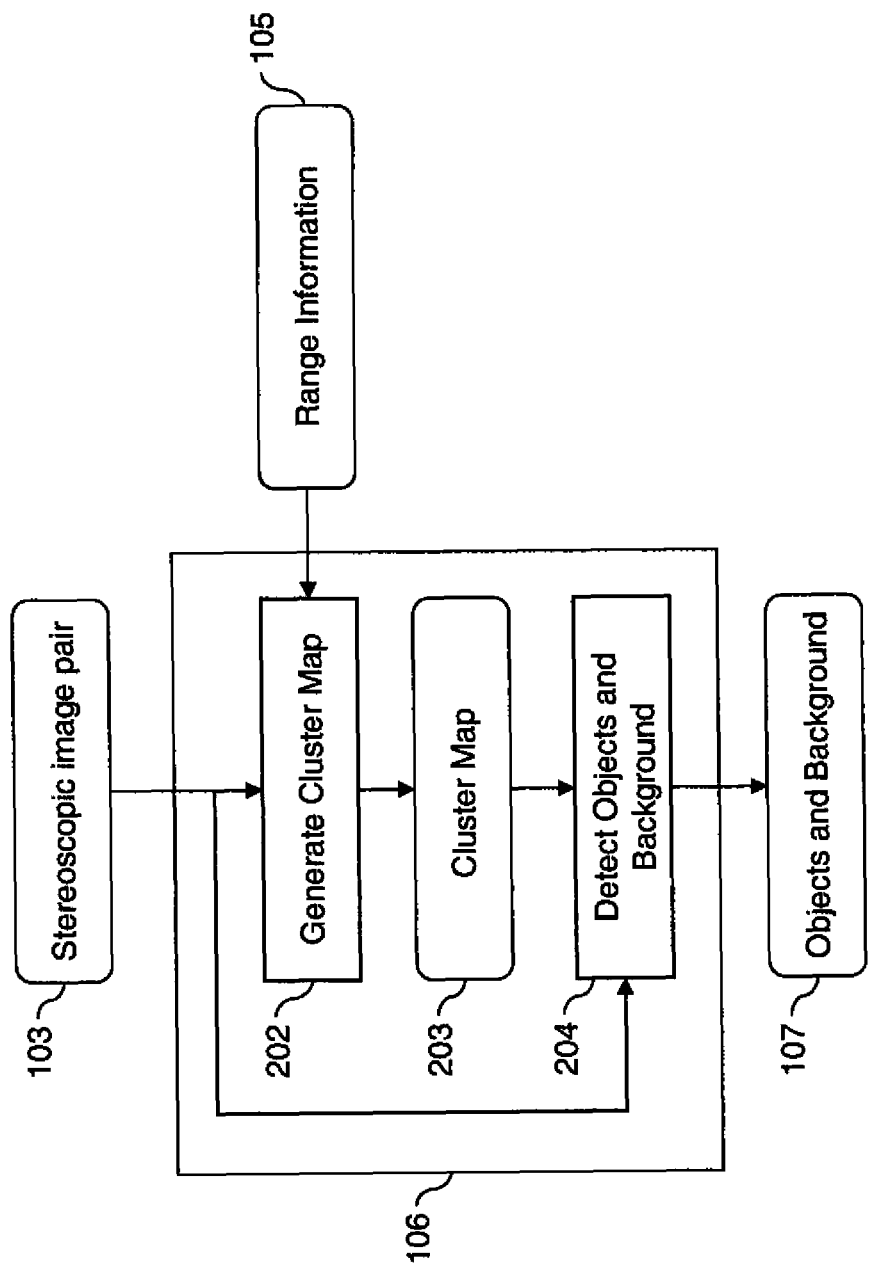
FIG. 3 is a flowchart illustrating additional details for the step of identifying objects and background shown in FIG. 2.

The data processing system 10 includes one or more data processing devices that implement the processes of the various embodiments of the present invention, including the example processes of FIGS. 2 and 3 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes of FIGS. 2 and 3 described herein. The data storage system 40 may be a distributed processor-accessible memory system including multiple processor-accessible memories communicatively connected to the data processing system 10 via a plurality of computers and/or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include connections between devices or programs within a single data processor, connections between devices or programs located in different data processors, and connections between devices not located in data processors at all. In this regard, although the data storage system 40 is shown separately from the data processing system 10, one skilled in the art will appreciate that the data storage system 40 may be contained completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

FIG. 2 is a flow diagram illustrating a method for adjusting perspective and disparity in a stereoscopic image pair according to an embodiment of the present invention. A stereoscopic image pair 103 representing a scene is received in receive stereoscopic image pair step 102. The stereoscopic image pair 103 can be captured by a stereo-image-capture device. The stereo-image-capture device can be a parallel camera, a multi-view camera, a single lens camera, or hybrid stereo image camera. Alternately, the stereoscopic image pair 103 may be a frame pair of two stereoscopic video sequence captured by a stereo-image-capture device.

Range information 105 associated with the digital image 103 is identified in identify range information step 104. The range information 105 includes distances of pixels in the scene from a known reference location. The viewpoint location needs to be identified relative to the given range information. Usually, the viewpoint location is the reference location. Range information 105 is preferably presented in the form of a range map provided by a ranging camera which uses visible light, inferred light, laser light or ultrasound to determine distances to pixels in the scene. Alternately, the range map can be provided using stereoscopic image processing techniques that involve capturing images of a scene from multiple viewpoints and determining the range information by evaluating the relative positions of objects in the scene. For cases where the range map has different dimensions (i.e., number of rows and columns) than the digital image 103, the range map is preferably interpolated so that it has the same dimensions.

In the identify objects and background step 106, objects and background 107 in a scene are identified based upon an analysis of the range information 105 and the stereoscopic image pair 103. A new stereoscopic image pair 109 is generated by adjusting perspective and disparity of the object and the background 107 in the stereoscopic image pair 103 based upon an analysis of the range information 105 in generate new stereoscopic image pair step 108. Because different people have different stereo experiences, the perspective and disparity adjustment is optionally based upon user-preference input 111 in one embodiment of the present invention. (The dashed lines in FIG. 2 indicate optional features.) For example, a particular user may have difficulty visually fusing stereoscopic image pairs if the disparity is too large. In this case, the user preference input 111 could indicate that the particular user prefers a lower disparity level. A user interface can be provided to allow a user to specify a user preference input 111. For example, a slide bar can be provided to enter a scale factor for an overall disparity level. The user can just slide the bar to a lower level to reduce the disparity. The generate new stereoscopic image pair step 107 can then reduce the disparity for each object by a scale factor and produce a new stereoscopic image pair 108 having the lower disparity level.

Because the objects and background in the stereoscopic images are detected, the perspective and disparity of a specific object can also be adjusted. For example, if it is desired to create a modified stereoscopic image pair where one specific object is modified so that it appears to be further from the viewpoint, it is necessary to reduce its size and the change disparity of this object in the new stereoscopic image pair 109. Changes of size and disparity of the object should be proportional to the change of distance of the object from the viewpoint. As the size and position of objects in the stereoscopic image pair are adjusted, portions of the background or objects that were previously occluded may be exposed. In order to fill in the pixel values for these regions in one of the images in the stereoscopic image pair 109, pixels can be copied from the corresponding objects or background region in the other image in the stereoscopic image pair 109. In cases where the object region was occluded in both of the images in the stereoscopic image pair 109, it will be necessary to determine pixel values by extrapolating from the portions of the object that are not occluded.

In one embodiment of the present invention, a processor to perform the perspective and disparity adjustment operations can be embedded in a stereo-image-capture device such as a parallel camera, a multi-view camera, a single lens camera, or hybrid stereo image camera. This enables the adjustment of the perspective and disparity at the time of image capture.

In store new stereoscopic image pair step 110, the new stereoscopic image pair 109 is stored in a data storage system

40 (FIG. 1) comprising a processor-accessible memory system. The processor-accessible memory system can be any type of digital memory that is commonly used in the art including magnetic storage media such as a hard disk; optical storage media such as an optical disk, or solid-state storage devices such as random access memory (RAM), or read-only memory (ROM).

FIG. 3 is a flowchart illustrating additional details for the identify objects and background step 106 shown in FIG. 2, according to an embodiment of the present invention. The stereoscopic image pair 103 and range information 105 comprising a range map are provided as discussed earlier. In generate cluster map step 202, a cluster map 203 is generated based on an analysis of the range information 105 and the stereoscopic image pair 103 as will be described in more detail relative to the discussion of FIG. 4. In detect objects and background step 204, objects and background 205 are detected in the stereoscopic images 103 by combining the cluster map 203 and the stereoscopic image pair 103 as:

$$\text{objects} = f(\text{cluster map}, I)$$

where the function f( ) is an object segmentation operation applied to the digital image I using the cluster map 203. The digital image I will be one of the images in the stereoscopic image pair 103. The function f( ) works by identifying pixels in the cluster map 203 having the same distance, then assigning the corresponding pixels in the digital image I to a corresponding object.

Figure 4:
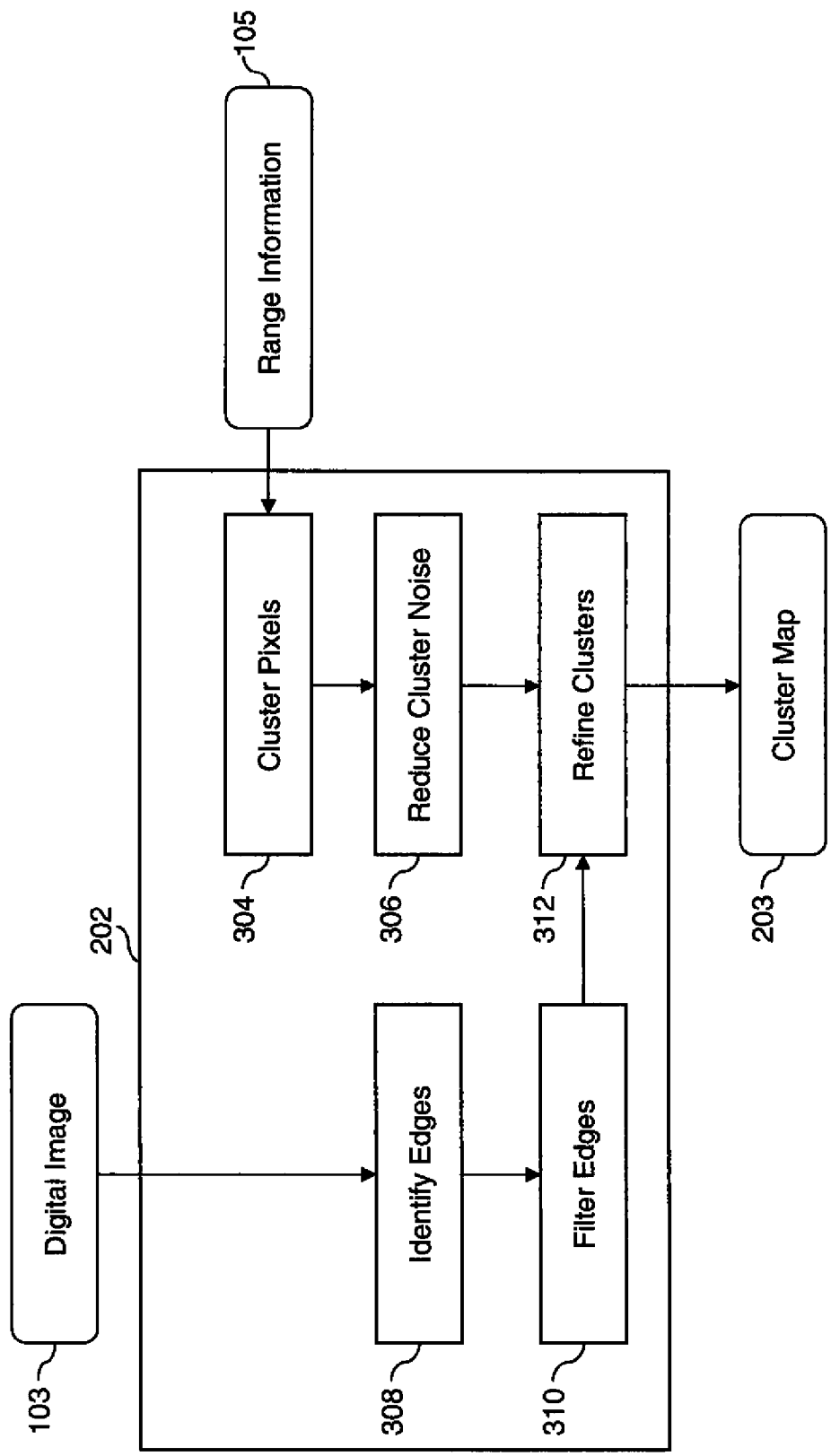
FIG. 4 is a flowchart illustrating additional details for the step of generating a cluster map shown in FIG. 3.

FIG. 4 is a flowchart illustrating additional details for the generate cluster map step 202 shown in FIG. 3 according to an embodiment of the present invention. A stereoscopic image pair 103 and range information 105 including a range map are provided as discussed earlier. In cluster pixels step 304, pixels in the range map are clustered by using a clustering algorithm such as the method described in "Dominant Sets and Pairwise Clustering", IEEE Transactions on Pattern Analysis & Machine Intelligence, Volume 29, No. 1, January 2007, pp. 167-172. The cluster groups generated in this manner typically have a lot of noise. Reduce cluster noise step 306 is used to reduce the cluster noise using a morphological method to fill small holes and remove small cluster regions.

Edges are detected in the stereoscopic image using an identify edges step 308. In a preferred embodiment of the present invention, the edges are identified using a gradient operation. The gradient of an image is defined as:

$$\nabla I = [G_x, G_y] = \left[\frac{\partial I}{\partial x}, \frac{\partial I}{\partial y}\right]$$

where I(x,y) is the intensity of pixel at location (x,y). The magnitude of the gradient vector is:

$$G = [G_x^2 + G_y^2]^{1/2}.$$

Edges are detected in the stereoscopic image based on the magnitude of the gradient in each pixel.

Next, filter edges step 310 is used to filter the detected edges to remove insignificant edges and keep the significant edges. Mathematically, the filtering operation can be expressed as:

$$E = f \times e,$$
$$f = \begin{cases} 0 & \text{if } (S(e) \leq T) \\ 1 & \text{if } (S(e) > T), \end{cases}$$

where e is one of the detected edges, S(e) is the sum of gradient magnitudes of each pixel in the edge e, f is a filter mask and T is the threshold.

The pixel clusters produced by the reduce cluster noise step 306 will typically still have errors in the boundary areas because of the noise in the range map. A refine clusters step 312 is used refine the cluster groups and produce cluster map 203. The boundary of cluster groups are refined by using the significant edges computed in the filter edges step 310. If pixels are outside of the detected significant edges in each cluster group, they will be removed. This will make the boundary of cluster groups much more accurate. Next, an average distance, n, is computed in each of the refined cluster group as:

$$n = \frac{1}{m} \sum_{i \in \text{cluster } w} dis(i),$$

where m is the number of pixels in the cluster group w, dis(i) is the distance of the $i^{th}$ pixel to the viewpoint location. By assigning the average distance to each pixel in the cluster groups, the cluster map is generated.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

| | PARTS LIST |
|---|---|
| 10 | Data processing system |
| 20 | Peripheral system |
| 30 | User interface system |
| 40 | Data storage system |
| 102 | Receive stereoscopic image pair step |
| 103 | Stereoscopic image pair |
| 104 | Identify range information step |
| 105 | Range information |
| 106 | Identify objects and background step |
| 107 | Objects and background |
| 108 | Generate new stereoscopic image pair step |
| 109 | New stereoscopic image pair |
| 110 | Store new stereoscopic image pair step |
| 111 | User preference input |
| 202 | Generate cluster map |
| 203 | Cluster map |
| 204 | Detect objects and background step |
| 304 | Cluster pixels step |
| 306 | Reduce cluster noise step |
| 308 | Identify edges step |
| 310 | Filter edges step |
| 312 | Refine clusters step |

What is claimed is:

1. A method comprising:
    receiving a stereoscopic image pair representing a scene;
    identifying range information associated with the stereoscopic image pair, wherein the range information includes distances of pixels in the scene from a reference location;
    generating a cluster map based at least upon an analysis of the range information using a clustering algorithm, wherein the cluster map groups pixels of the stereoscopic images by distances from a viewpoint;
    identifying objects and background in the stereoscopic image pair based at least upon an analysis of the cluster map and the stereoscopic image pair wherein the analysis of the cluster map and the stereoscopic image pair includes:
    identifying edges in the stereoscopic image pair ; and
    refining pixel groupings in the cluster map by comparing the identified edges with borders of the pixel groupings and removing pixels that are outside of the identified edges from the pixel groupings;
  generating a new stereoscopic image pair by adjusting perspective and disparity for at least one of the identified objects or the background in the stereoscopic image pair, wherein the adjusting occurs based at least upon the range information; and
  storing the new stereoscopic image pair in a processor-accessible memory system.

2. The method of claim 1, wherein the perspective and disparity adjustment is responsive to a user-preference input.

3. The method of claim 1, further comprising filtering the identified edges to remove insignificant edges prior to the comparing the identified edges with borders of the pixel groupings.

4. The method of claim 1, wherein the range information is identified at least from an analysis of the stereoscopic image pair.

5. The method of claim 1, wherein a magnitude of the perspective and disparity adjustment is responsive to a distance of the object from a viewpoint location.

6. The method of claim 5, wherein the viewpoint location is the reference location.

7. The method of claim 1, wherein the analysis of the cluster map comprises reducing noise from the cluster map.

8. The method of claim 7, wherein the reducing of noise from the cluster map fills small holes and removes small clustered regions from the cluster map.

9. A non-transitory computer-readable medium having instructions store thereon that upon execution by a computing device cause the computing device to perform a method comprising:
  receiving a stereoscopic image pair representing a scene;
  identifying range information associated with the stereoscopic image pair, wherein the range information includes distances of pixels in the scene from a reference location;
  generating a cluster map based at least upon an analysis of the range information using a clustering algorithm, wherein the cluster map groups pixels of the stereoscopic images by distances from a viewpoint;
  identifying objects and background in the stereoscopic image pair based at least upon an analysis of the cluster map and the stereoscopic image pair, wherein the analysis of the cluster map and the stereoscopic image pair includes:
    identifying edges in the stereoscopic image pair: and
    refining pixel groupings in the cluster map by comparing the identified edges with borders of the pixel groupings and removing pixels that are outside of the identified edges from the pixel groupings:
  generating a new stereoscopic image pair by adjusting perspective and disparity for at least one of the identified objects or the background in the stereoscopic image pair, wherein the adjusting occurs based at least upon the range information: and
  storing the new stereoscopic image pair in a processor-accessible memory system.

10. The non-transitory computer-readable medium of claim 9, wherein the perspective and disparity adjustment is responsive to a user-preference input.

11. The non-transitory computer-readable medium of claim 9, wherein the memory system further comprises instructions to filter the identified edges to remove insignificant edges prior to comparing the identified edges with borders of the pixel groupings.

12. The non-transitory computer-readable medium of claim 9, wherein a magnitude of the perspective and disparity adjustment is responsive to a distance of the object from a viewpoint location.

13. The non-transitory computer-readable medium of claim 12, wherein the viewpoint location is the reference location.

14. The non-transitory computer-readable medium of claim 9, wherein the instructions to identify objects and background in the stereoscopic image pair comprise instructions to reduce noise from the cluster map.

15. The non-transitory computer-readable medium of claim 14, wherein the reducing of noise from the cluster map fills small holes and removes small clustered regions from the cluster map.

16. A system comprising:
  a data processing system; and
  a memory system communicatively connected to the data processing system and storing instructions configured to cause the data processing system to implement a method for adjusting perspective and disparity in a stereoscopic image pair, wherein the instructions comprise:
    instructions to receive the stereoscopic image pair representing a scene;
    identifying instructions to identify range information associated with the stereoscopic image pair, wherein the range information includes distances of pixels in the scene from a reference location;
    instructions to generate a cluster map based at least upon an analysis of the range information using a clustering algorithm, wherein the cluster map groups pixels of the stereoscopic images by distances from a viewpoint;
    instructions to identify objects and background in the stereoscopic image pair based at least upon an analysis of the cluster map and the stereoscopic image pair, wherein the analysis of the cluster map and the stereoscopic image pair includes:
      identifying edges in the stereoscopic pair; and
      refining the pixel groupings in the cluster map by comparing the identified edges with borders of the pixel groupings and removing pixels that are outside of the identified edges from the pixel groupings;
    instructions to generate a new stereoscopic image pair by adjusting perspective and disparity for at least one of the identified objects or the background in the stereoscopic image pair, wherein the adjusting is based at least upon the range information; and
    instructions to store the new stereoscopic image pair in a processor-accessible memory system.

17. The system of claim 16, wherein the stereoscopic image pair is received from a stereo-image-capture device.

18. The system of claim 17, wherein the range information is identified at least from an analysis of the stereoscopic image pair.

19. The system of claim 16, wherein the data processing system comprises at least part of a stereo-image-capture device.

20. The method system of claim 19, wherein the stereo-image-capture device comprises a parallel camera, a multi-view camera, a single lens camera, or a hybrid stereo image camera.

* * * * *

UNITED STATES PATENT AND TRADEMARK OFFICE
CERTIFICATE OF CORRECTION

| | | |
|---|---|---|
| PATENT NO. | : 8,509,519 B2 | Page 1 of 1 |
| APPLICATION NO. | : 12/511111 | |
| DATED | : August 13, 2013 | |
| INVENTOR(S) | : Wang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this
Twenty-fourth Day of February, 2015

Michelle K. Lee
*Deputy Director of the United States Patent and Trademark Office*